(12) United States Patent
Wanat (10) Patent No.: US 7,389,721 B2
(45) Date of Patent: Jun. 24, 2008

(54) COMBINED FOOD COOKER AND STEAMER

(75) Inventor: David J. Wanat, Merdien, CT (US)

(73) Assignee: Conair Corporation, Stamford, CT (US)

( * ) Notice: Subject to any disclaimer, the term of this patent is extended or adjusted under 35 U.S.C. 154(b) by 370 days.

(21) Appl. No.: 10/879,478

(22) Filed: Jun. 29, 2004

(65) Prior Publication Data
US 2005/0005778 A1    Jan. 13, 2005

Related U.S. Application Data

(60) Provisional application No. 60/483,716, filed on Jun. 30, 2003.

(51) Int. Cl.
*A47J 27/00* (2006.01)
*A47J 27/04* (2006.01)
*A47J 37/06* (2006.01)

(52) U.S. Cl. ............................. 99/340; 99/413; 99/410; 99/403; 426/438; 426/510; 426/523

(58) Field of Classification Search ............. 99/413, 99/412, 411, 410, 414, 340, 339, 403; 219/441, 219/442, 432; 210/469, 465; 426/438, 510, 426/523
See application file for complete search history.

(56) References Cited

U.S. PATENT DOCUMENTS

| 63,772 | A | * | 4/1867 | Whitney ..................... 99/410 |
|---|---|---|---|---|
| 213,763 | A | | 4/1879 | Lee |
| 875,972 | A | | 1/1908 | Wessel |
| 2,097,478 | A | * | 11/1937 | Struble ........................ 99/412 |
| 2,597,695 | A | | 5/1952 | Braski et al. .................. 219/44 |
| 2,785,277 | A | | 3/1957 | Jepson ......................... 219/44 |
| 3,380,376 | A | * | 4/1968 | Preis ........................... 99/413 |
| 5,189,947 | A | | 3/1993 | Yim |
| D338,132 | S | | 8/1993 | Chang ........................ D7/356 |
| D381,553 | S | | 7/1997 | Canduanides ................ D7/356 |
| 5,839,357 | A | | 11/1998 | Ha et al. ...................... 99/337 |
| 6,055,901 | A | * | 5/2000 | Gantos et al. ................ 99/412 |
| 6,100,504 | A | | 8/2000 | Wagner ....................... 219/432 |
| 6,196,115 | B1 | | 3/2001 | Tsao |
| 6,283,015 | B1 | | 9/2001 | Kwon et al. ................. 99/337 |
| 6,305,272 | B1 | | 10/2001 | Lin |
| 6,546,849 | B1 | * | 4/2003 | Shimazaki ................... 99/413 |
| 6,568,314 | B1 | * | 5/2003 | Stepanova ................... 99/340 |

* cited by examiner

*Primary Examiner*—Reginald L Alexander
(74) *Attorney, Agent, or Firm*—Lawrence Cruz (57) ABSTRACT

A cooking device and method for cooking food items by boiling and by steaming is provided. The method of cooking the food items includes placing an amount of liquid in a recess of the cooking device, heating the recess to heat a liquid therein to a cooking temperature, and receiving the sidewalls of a bowl having apertures in a bottom surface thereof in the recess, in a first position, for cooking by boiling. The bowl is supported in a second position over the recess on an intermediate member for cooking the food items by steaming.

17 Claims, 16 Drawing Sheets

COMBINED FOOD COOKER AND STEAMER

CROSS-REFERENCE TO RELATED APPLICATIONS

This application claims priority to U.S. Provisional Patent Application Ser. No. 60/483,716 filed on Jun. 30, 2003, incorporated herein by reference in its entirety.

BACKGROUND OF THE INVENTION

1. Field of the Invention

The present invention relates to a cooker. More particularly, the present invention relates to a compact cooker for boiling a first food product, such as rice, and for steaming a second food product, such as vegetables, at the same time.

2. Description of the Related Art

Compact devices for cooking are known in the art. A cooker such as, for example, a boiler of the type shown in U.S. Pat. No. 5,189,947 to Yim, are known to cook food items such as, for example, rice and vegetables by boiling the food items. These types of boilers have a reservoir. The reservoir is circular in shape and can contain an amount of water therein. The food items are placed in water contained in the reservoir and are cooked by heating the water.

Other types of cooking devices, called steamers, use steam to cook a food product. A steamer generally has a reservoir that is circular in shape. A container is located in the reservoir. A support is disposed on a bottom of the reservoir to support the container in the reservoir above an amount of water in the reservoir. The water is heated to a boil by a heater to create steam. The container has a number of apertures therein to allow steam produced in the reservoir to pass through the bottom of the container and cook the food located in the container.

However, the devices discussed above either boil or steam food. The boiler cooks its food items by boiling. The steamer cooks its food items by steaming. It is inefficient and costly to separately operate a boiler and a steamer contemporaneously with one another.

Cooking with a dedicated steamer and a dedicated boiler simultaneously, in order to cook by steam and by boiling, requires purchasing, cooking, cleaning, and storing each of the boiler and the steamer. The user must learn the operating procedure(s) involved with each of the cooking devices. Also, the user must coordinate the cooking times of food being cooked by each device in order to complete the boiling and the steaming processes simultaneously.

Thus, there exist a need for a cooking device that can cook food items by boiling and by steaming the food items.

SUMMARY OF THE INVENTION

It is an object of the present invention to provide an improved cooking device.

It is another object of the present invention to provide a cooking device that cooks food items by boiling and by steaming.

It is still another object of the present invention to provide the cooking device that effectively and efficiently boils and steams the food items.

It is yet another object of the present invention to provide the cooking application device that is ergonomically shaped for convenient and versatile handling and storage of the device.

These and other objects and advantages of the present invention are achieved by a cooking device having a housing having a recess therein and a bowl having apertures in a bottom surface thereof and sidewalls spaced for being received in the recess. An intermediate member is provided for positioning the bowl over the recess. The intermediate member preferably has a plurality of apertures therethrough that align the apertures of the intermediate member with the apertures in the bottom surface of the bowl.

The present invention provides a method of cooking a food item including placing an amount of liquid in the recess of the cooking device, heating the recess to heat the temperature of the liquid to a cooking temperature, receiving the sidewalls of the bowl having apertures in a bottom surface thereof in the recess in a first position, and supporting the bowl over the recess on an the intermediate member in a second position.

DETAILED DESCRIPTION OF THE INVENTION

Figure 1:
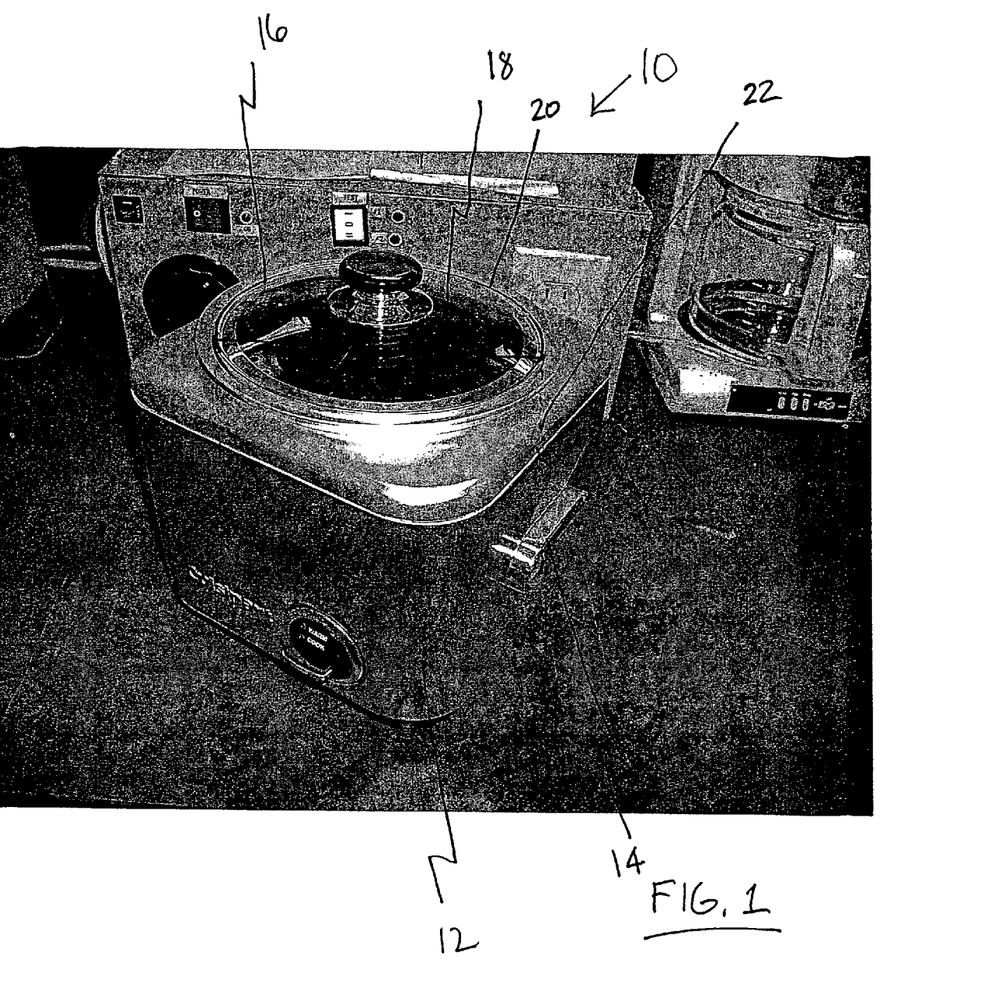
FIG. 1 is a perspective view of a cooking device in accordance with the present invention.
Figure 2:
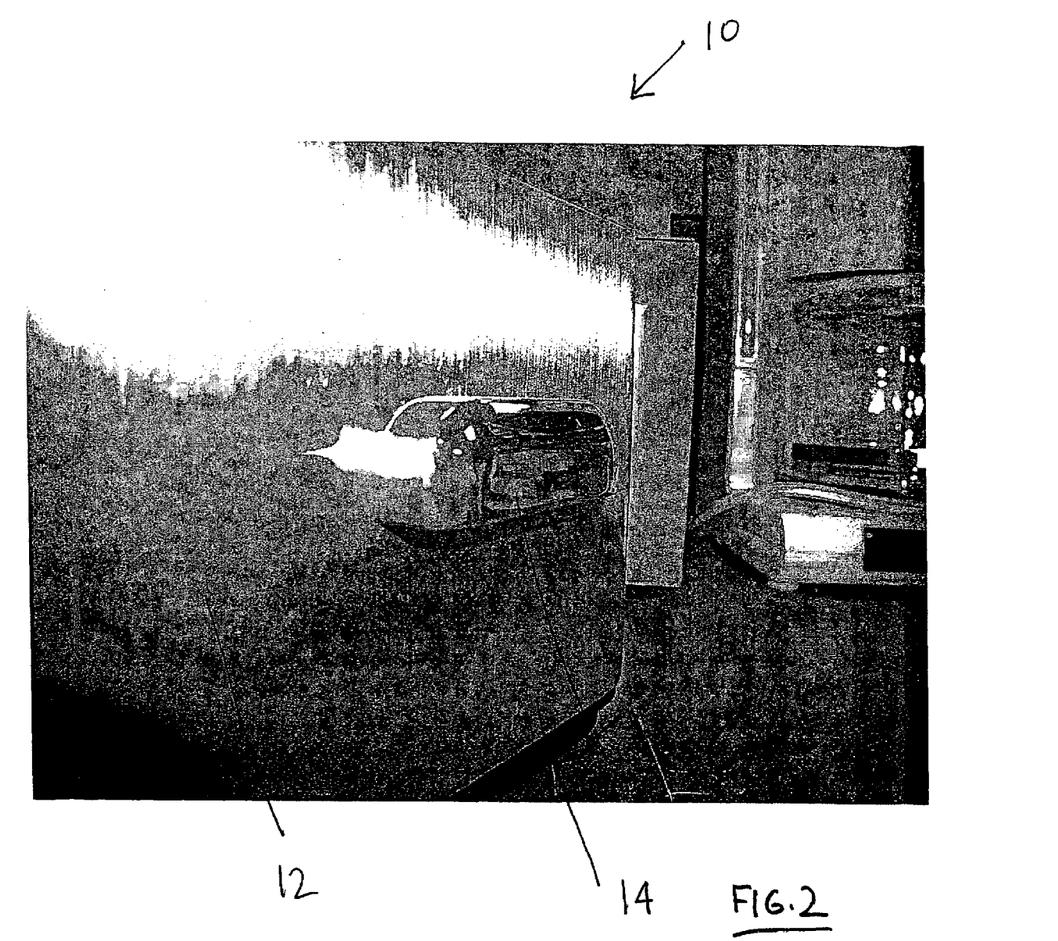
FIG. 2 is a perspective view of a handle of the cooking device of FIG. 1.
Figure 3:
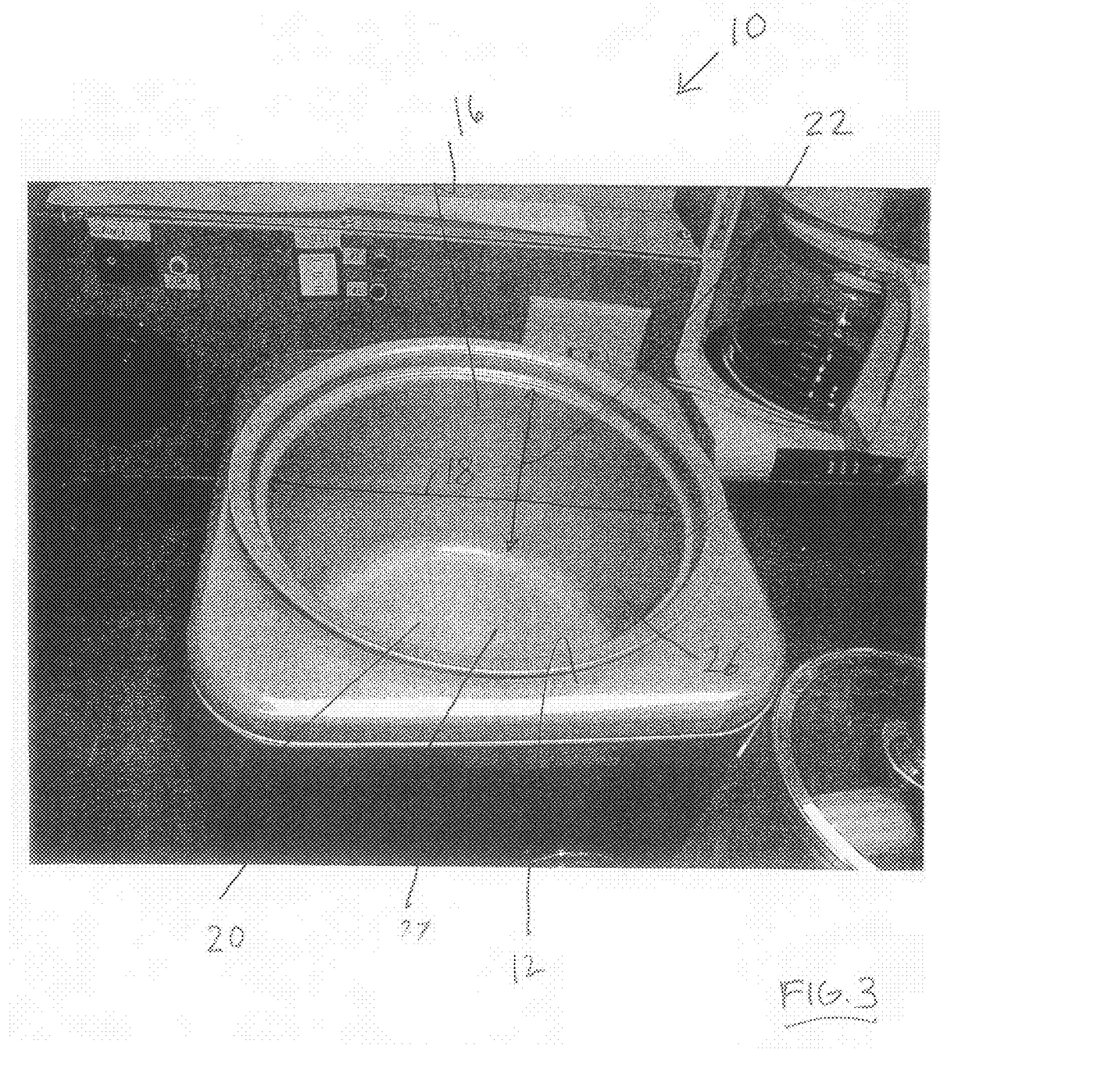
FIG. 3 is a perspective view of a recess portion of the cooking device of FIG. 1.
Figure 4:
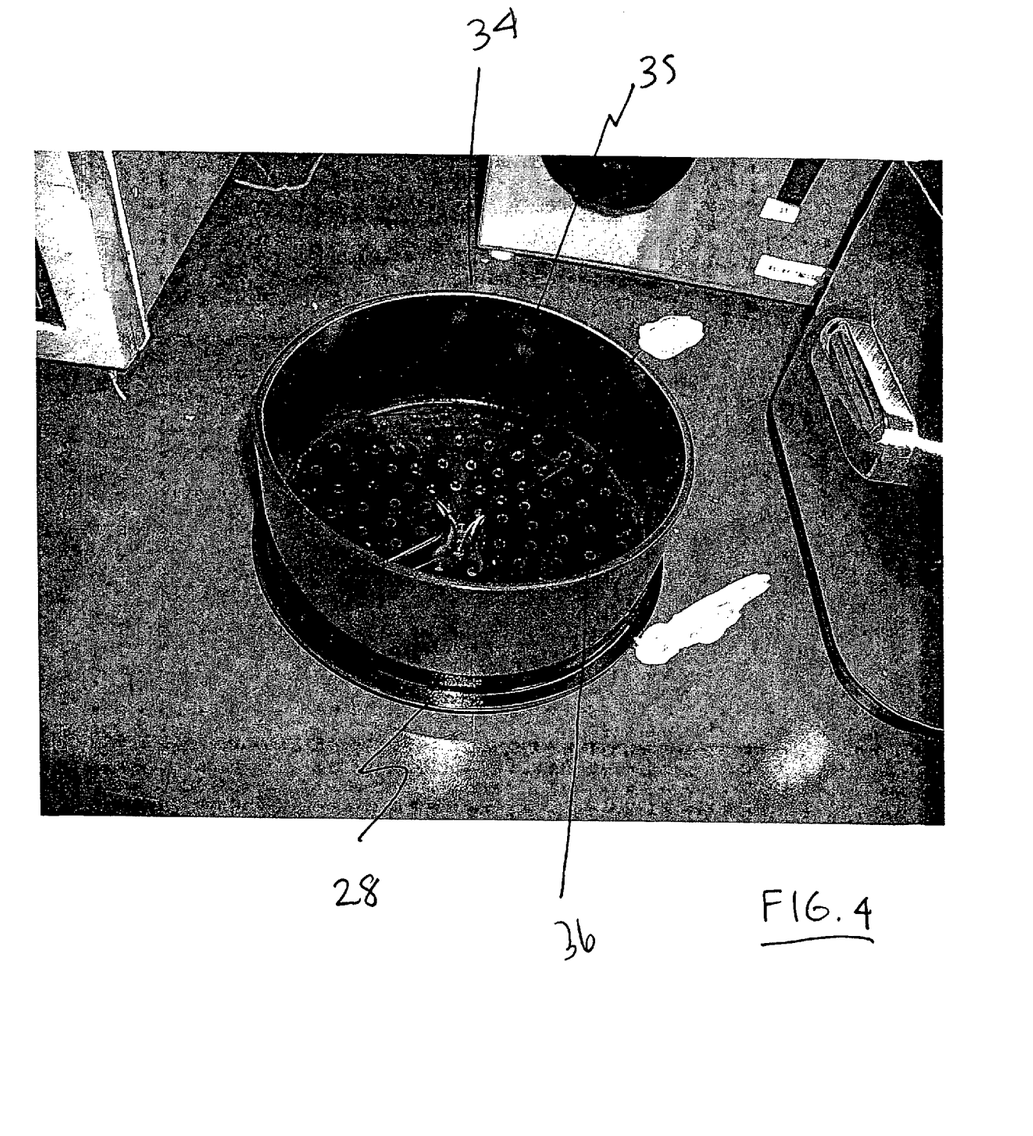
FIG. 4 is a perspective view of a bowl with an intermediate member connected to the bowl.
Figure 5:
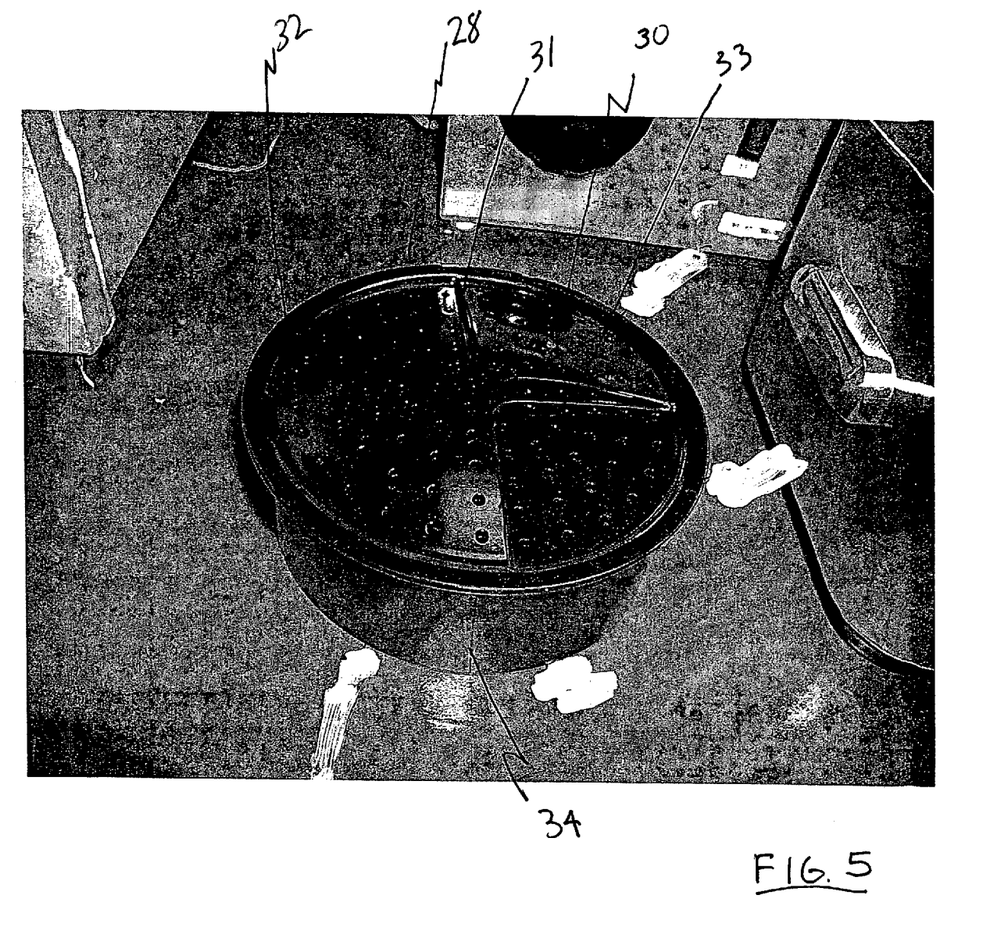
FIG. 5 is a perspective view of the bowl of FIG. 4, with the bottom of the bowl facing upward.
Figure 6:
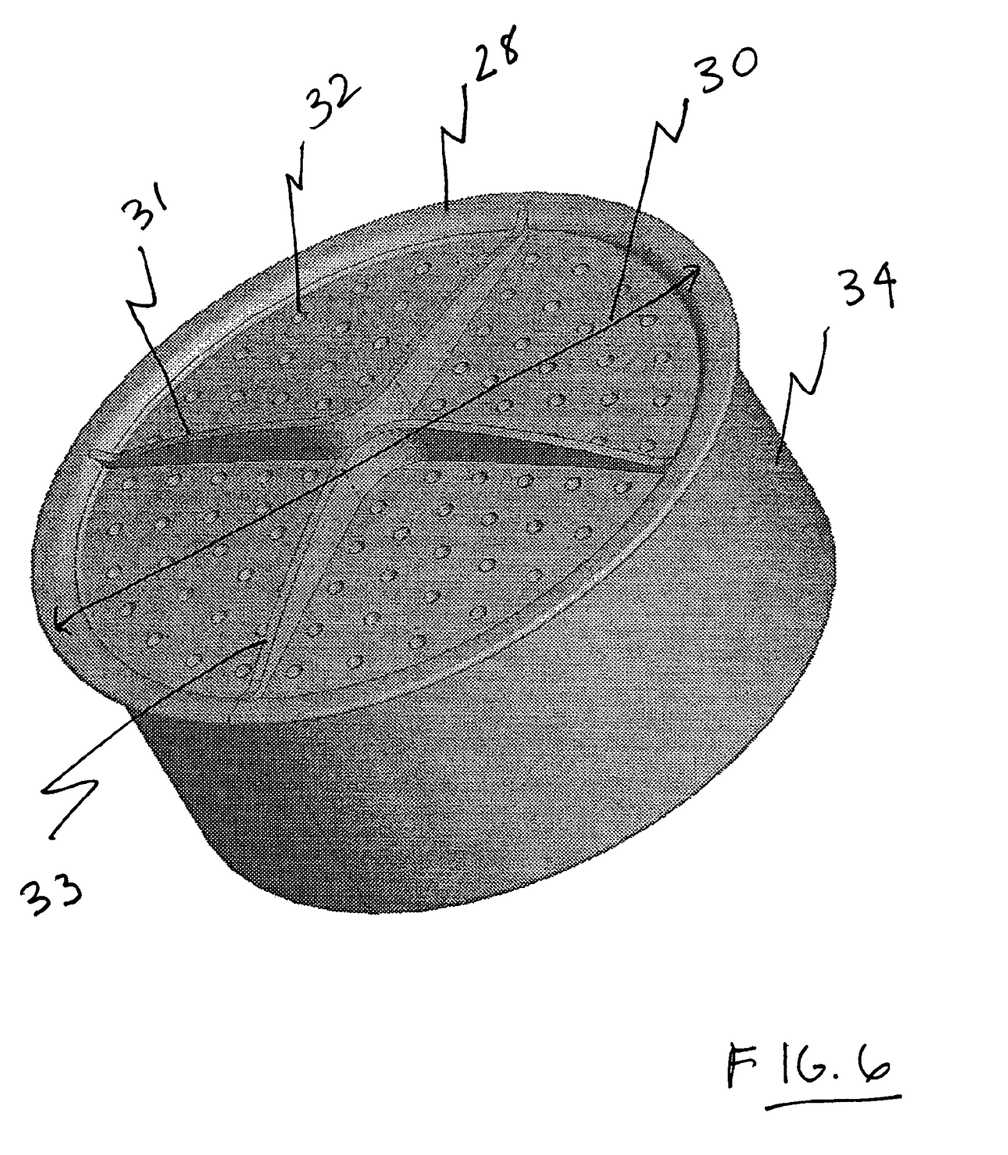
FIG. 6 is a perspective view of the bowl with an intermediate member connected to the bowl of FIG. 4.
Figure 7:
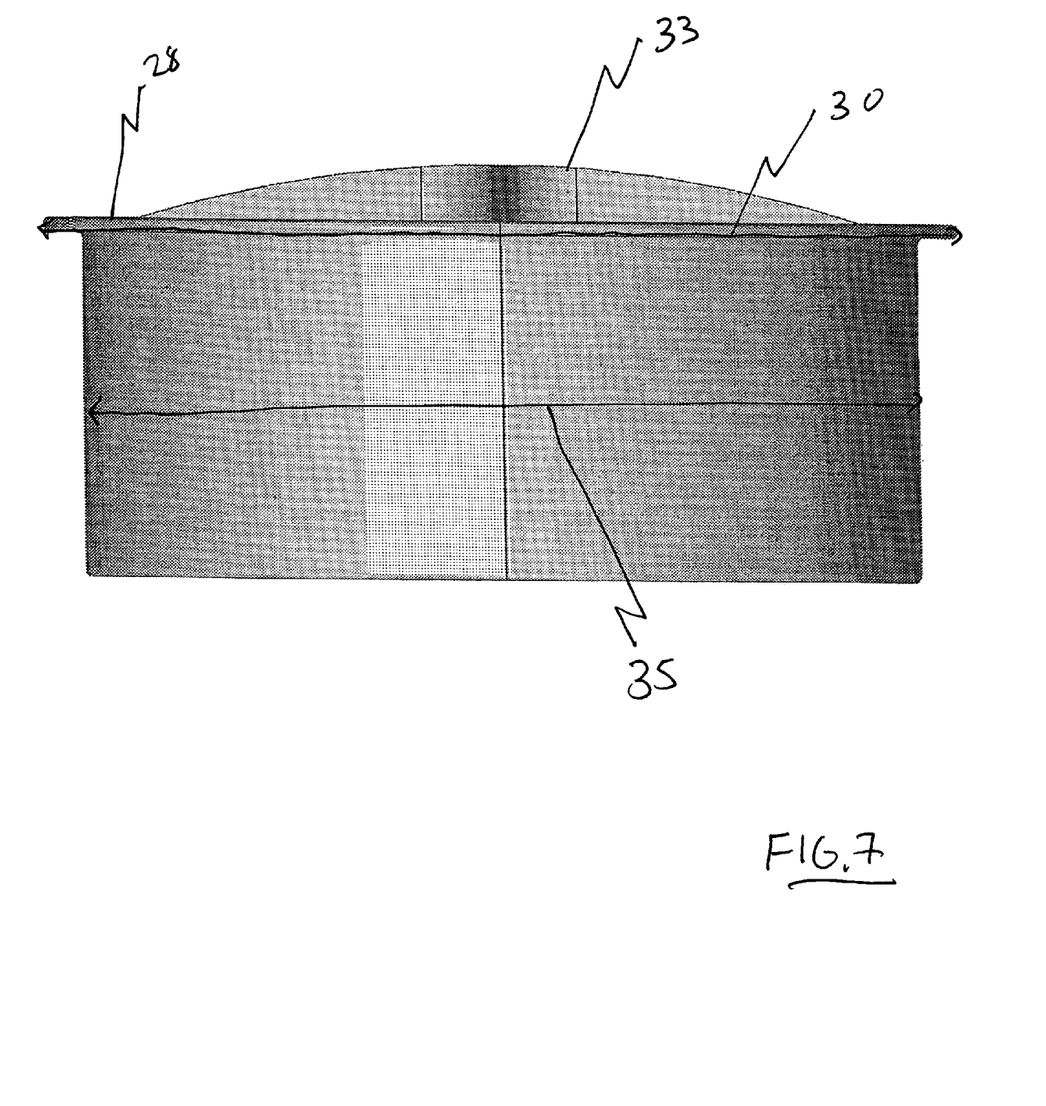
FIG. 7 is a side view of the bowl with an intermediate member connected to the bowl of FIG. 4.
Figure 8:
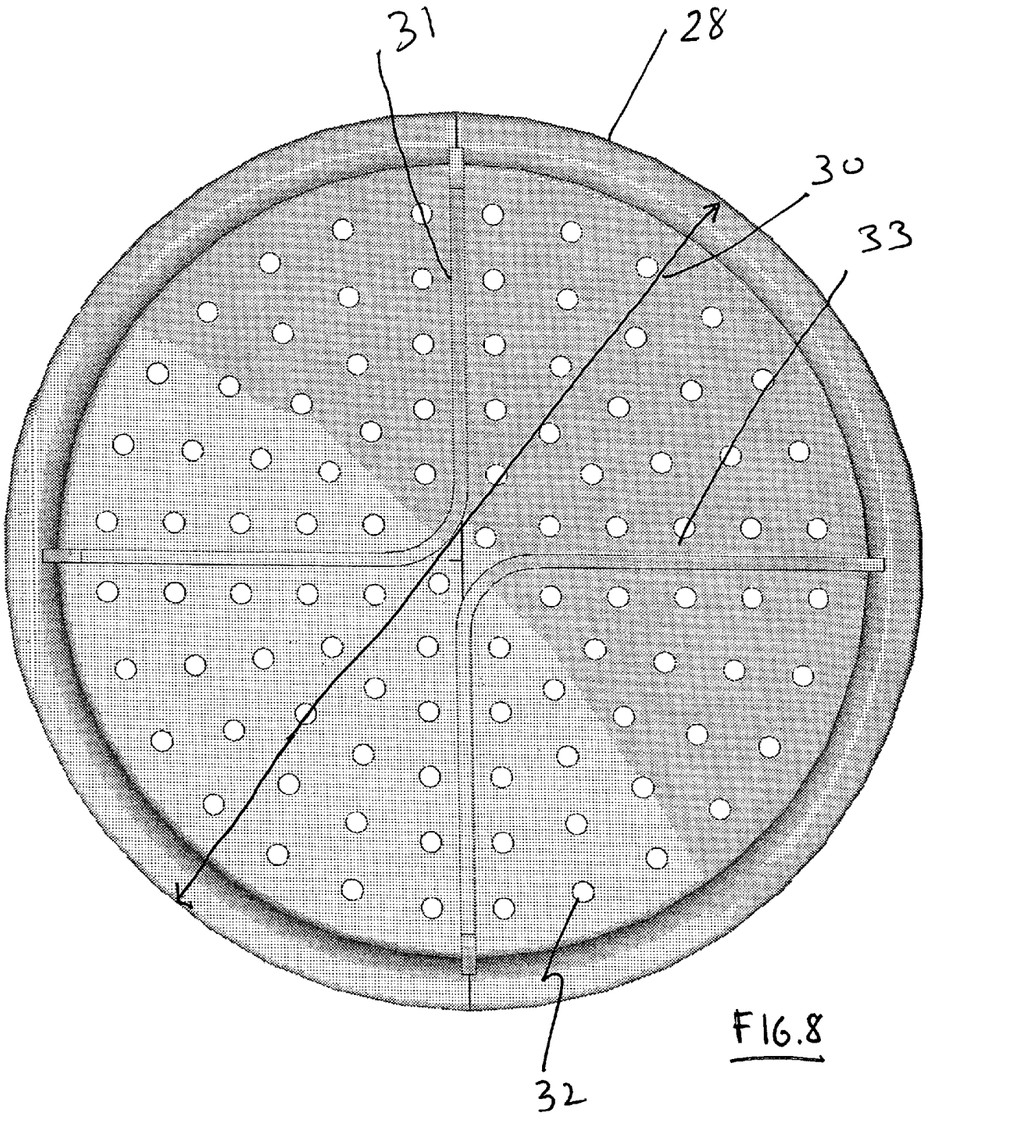
FIG. 8 is a top view of the bowl with the intermediate member connected to the bowl of FIG. 7.

Referring to the figures and, in particular, to FIGS. 1 through 3, there is provided a cooking device according to the present invention generally represented by reference numeral 10. Cooking device 10 has a housing 12. Housing 12 is preferably formed from a suitable durable thermoplastic material or any metal material, as known in the art.

Referring to FIGS. 2 and 3, cooking device 10 preferably has an generally rectangular exterior configuration or shape. The generally rectangular exterior shape facilitates easy storage and transport of cooking device 10. Exemplary cooking device 10 has a pair of handles 14 (one shown). One handle 14 is located on one side of cooking device 10 and the other handle 14 is located on the opposing side of cooking device 10. Cooking device 10 has a recess 20 with an open end at an upper surface thereof and a depth 22.

Recess 20 is preferably cylindrical in configuration. A bottom surface 27 and side wall portion of recess 20 are preferably made from a thermally conductive material, such as a metal. Recess 20 may have another configuration, such as, for example, a rectangular configuration or other shaped configuration.

Cooking device 10 has a heater (not shown) for heating items placed in recess 20. The heater is preferably a heater wire, although other types of heating elements may be used. The heater is preferably energized by a residential or commercial main power line. The heater is preferably disposed in an interior 26 of the cooking device 10 in close proximity to bottom surface 27 of recess 20. In this manner, when the heater is energized the heater will heat recess 20 and the contents placed therein.

Cooking device 10 has a bowl 34. Bowl 34 is preferably made from a thermally conductive material and cylindrical in shape. Bowl 34 has a third diameter 35. Third diameter 35 is preferably less than first diameter 18 of recess 20 and second diameter 30 of intermediate member 28.

In one embodiment, sidewalls of bowl 34 have a height that is about the same as depth 22 of recess 20 and a diameter (i.e, spacing) about the same as diameter 35. This allows the sidewalls of bowl 34 to be selectively retained in recess 20, for example, for storage purposes or during cooking.

Figure 9:
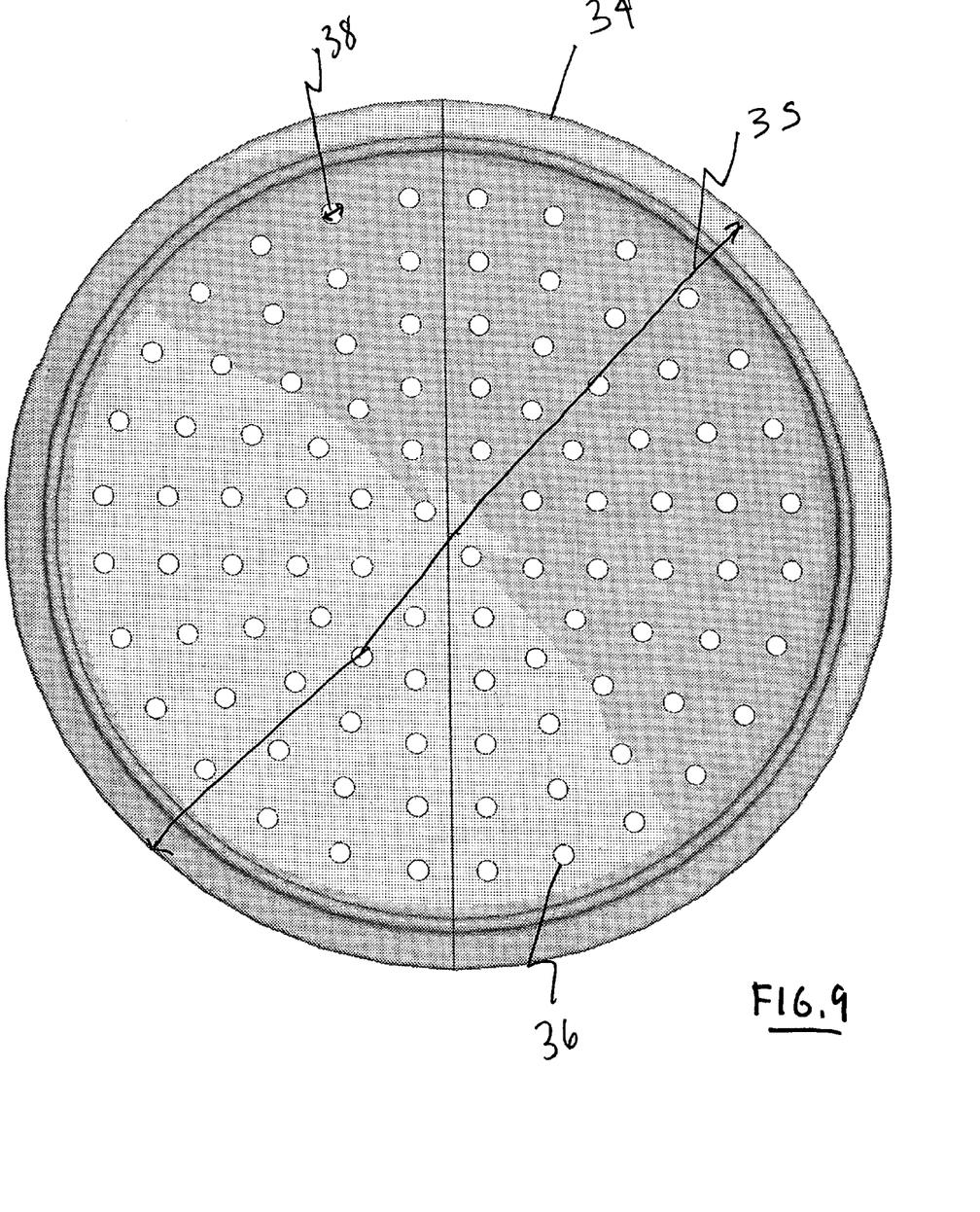
FIG. 9 is a top view of the bowl of FIG. 4.

Referring to FIG. 9, bowl 34 has, in an aspect hereof, a number of apertures 36. Each aperture 36 has a fourth diameter 38. Fourth diameter 38 is sufficiently sized to allow steam to enter bowl 34 while blocking the passage of relatively small food items (e.g., peas, carrots, corn, rice, etc.) placed in bowl 34.

Referring to FIGS. 4 through 10, cooking device 10 has an intermediate member 28. Intermediate member 28 is generally disk shaped, having a second diameter 30. Second diameter 30 is preferably larger than first diameter 18.

Preferably, intermediate member 28 has a number of apertures 32 therethrough. The number of apertures 32 is sufficient in number and size to allow steam to traverse therethrough. Preferably, intermediate member 28 is connected to a bowl 34, either removably or integrally. Intermediate member 28 can rest on a top of the recess 20.

In another embodiment, intermediate member 28 has a first "L" shaped flange 31 and a second "L" shaped flange 33. The first and second "L" shaped flanges 31, 33 are joined to the intermediate member 28 and protrude slightly opposite the intermediate member. The first and second "L" shaped flanges 31, 33 allow the intermediate member 28 to be slightly raised when disposed on a flat surface.

Cooking device 10 can cook food items in at least two modes, boiling and steaming. First, cooking device 10 can cook food items by boiling the food items in a liquid (e.g., water) placed in recess 20. For example, cooking device can cook vegetables and rice by boiling. Second, cooking device 10 can cook food items by steaming the items placed in bowl 34 and supported over recess 20 while liquid placed in recess 20 is heated to boiling to produce steam.

In another embodiment, cooking device 10 can cook a number of food items by boiling and, simultaneously, cook other food items by steaming. Accordingly, a number of food items can be selectively prepared by boiling or steaming simultaneously. For example, cooking device 10 can steam vegetables in bowl 34 supported on top of cooking device 10 over recess 20 while boiling other vegetables in a liquid in the recess. Accordingly, a very productive and efficient cooking process can be achieved by cooking with cooking device 10.

Figure 10:
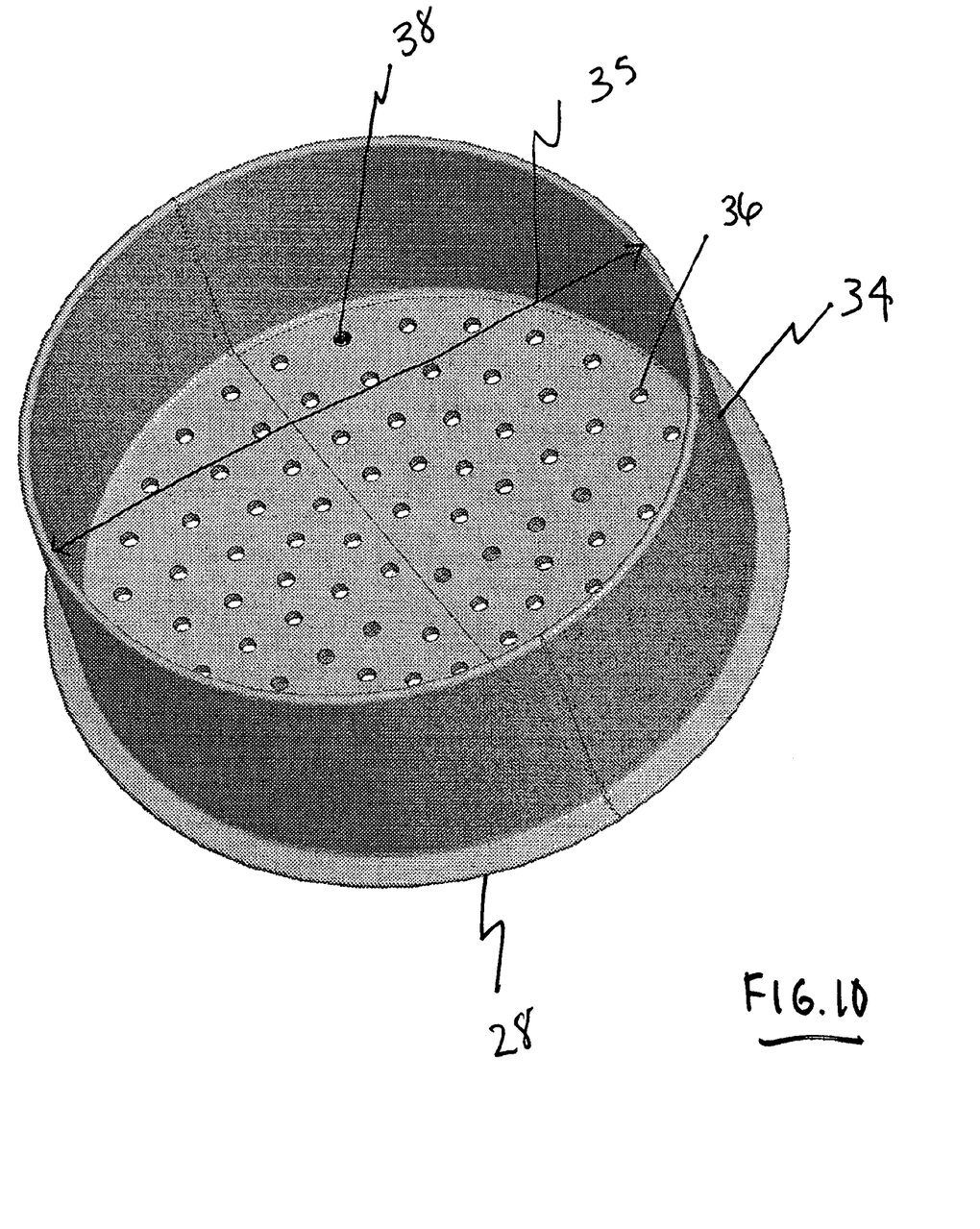
FIG. 10 is another perspective view of the bowl of FIG. 4 with an intermediate member connected thereto.

FIG. 10 illustrates an exemplary embodiment of intermediate member 28 and bowl 34 in which they are integrally connected together. In an aspect hereof, apertures 32 in intermediate member 28 and apertures 36 in the bottom of bowl 34 are complementary and communicate with one another to allow steam to traverse through both intermediate member 28 and bowl 34 to cook food items placed in bowl 34.

Figure 11:
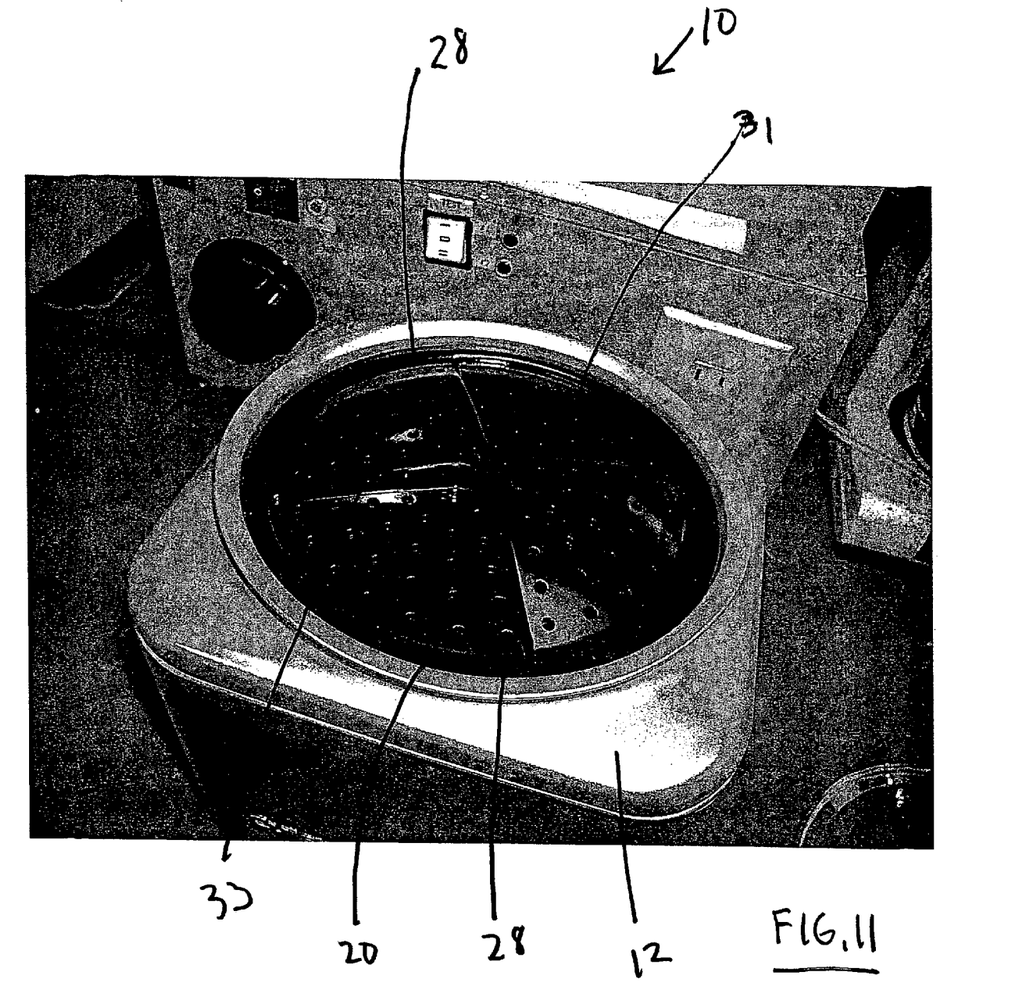
FIG. 11 is a perspective view of the cooking device with the bowl in a first position, in accordance with the present invention.
Figure 12:
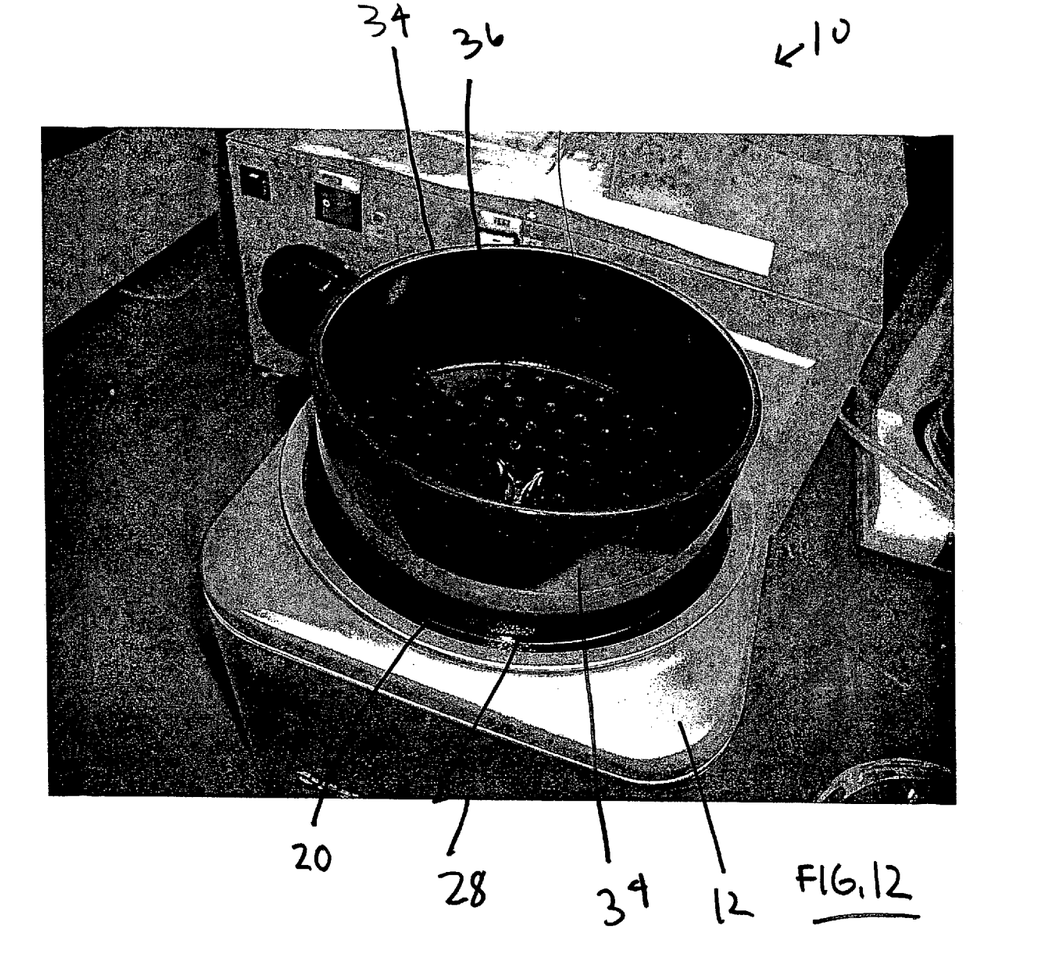
FIG. 12 is a perspective view of the cooking device with the bowl in a second position, the bowl being connected to the intermediate member, in accordance with the present invention.

Referring to FIGS. 11 and 12, an exemplary operating sequence for cooking using cooking device 10 will be described. A user fills recess 20 with a liquid such as water or a broth. A food item can be placed in the liquid at this time or a later time. The water is heated to a predetermined cooking temperature. Bowl 34 is positioned with the sidewalls thereof extending downwardly into recess 20. This positioning of bowl 34 in cooking device is referred to as a first position and is shown in FIG. 11.

In another embodiment of the present invention, the cooking temperature is at least the boiling temperature of the liquid. In another aspect, the cooking temperature is less than the boiling temperature of the liquid but sufficient to cook the food item. When the cooking temperature is at least the boiling temperature of the liquid, steam is produced.

Referring to FIG. 12, if the user wishes to cook a food item by steaming the food item, the user places bowl 34 and intermediate member 28 on top of and over the upper surface (i.e., top) of recess 20. This positioning of bowl 34 over recess 20 of cooking device 10 is referred to herein as a second position and is shown in FIG. 12. That is, the second position is where intermediate member 28 is positioned over recess 20 and, bowl 34 is positioned on intermediate member 28 with the sidewalls of the bowl extend upwardly above recess 20.

The second diameter 30 is preferably larger than first diameter 18, and supports the intermediate member 28 over the recess portion 20. In this manner, the heat generated from the heater communicates to the intermediate member 28 and the bowl 34 to heat the contents in the bowl.

In an aspect of the present invention, steam exiting from the liquid in recess 20 passes through apertures 32 and through apertures 36 to heat food items by steam in bowl 34. In this manner, cooking device 10 may simultaneously cook food items in recess 20 and food items in bowl 34.

Figure 13:
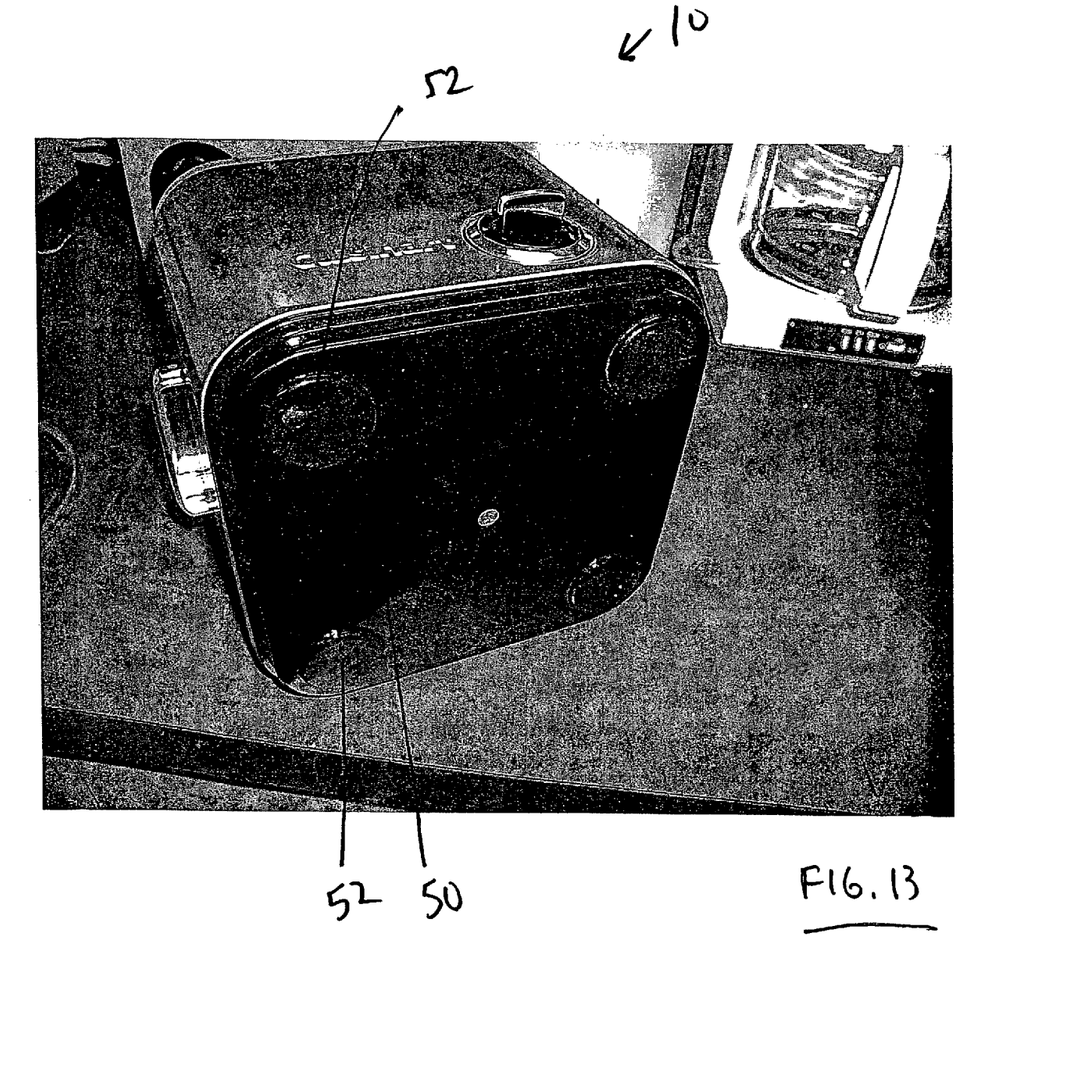
FIG. 13 is a perspective view of the bottom of the cooking device of FIG. 1, in accordance with the present invention.

Referring to FIG. 13, a bottom 50 of cooking device 10 is generally flat. Bottom 50 may have a number of vents (not shown) therethrough. The vents can act to cool the electrical components internal to cooking device 10. Bottom 50 has a number of legs 52. Legs 52 are generally orthogonal in shape and support cooking device 10 on, for example, a table or a floor.

Figure 14:
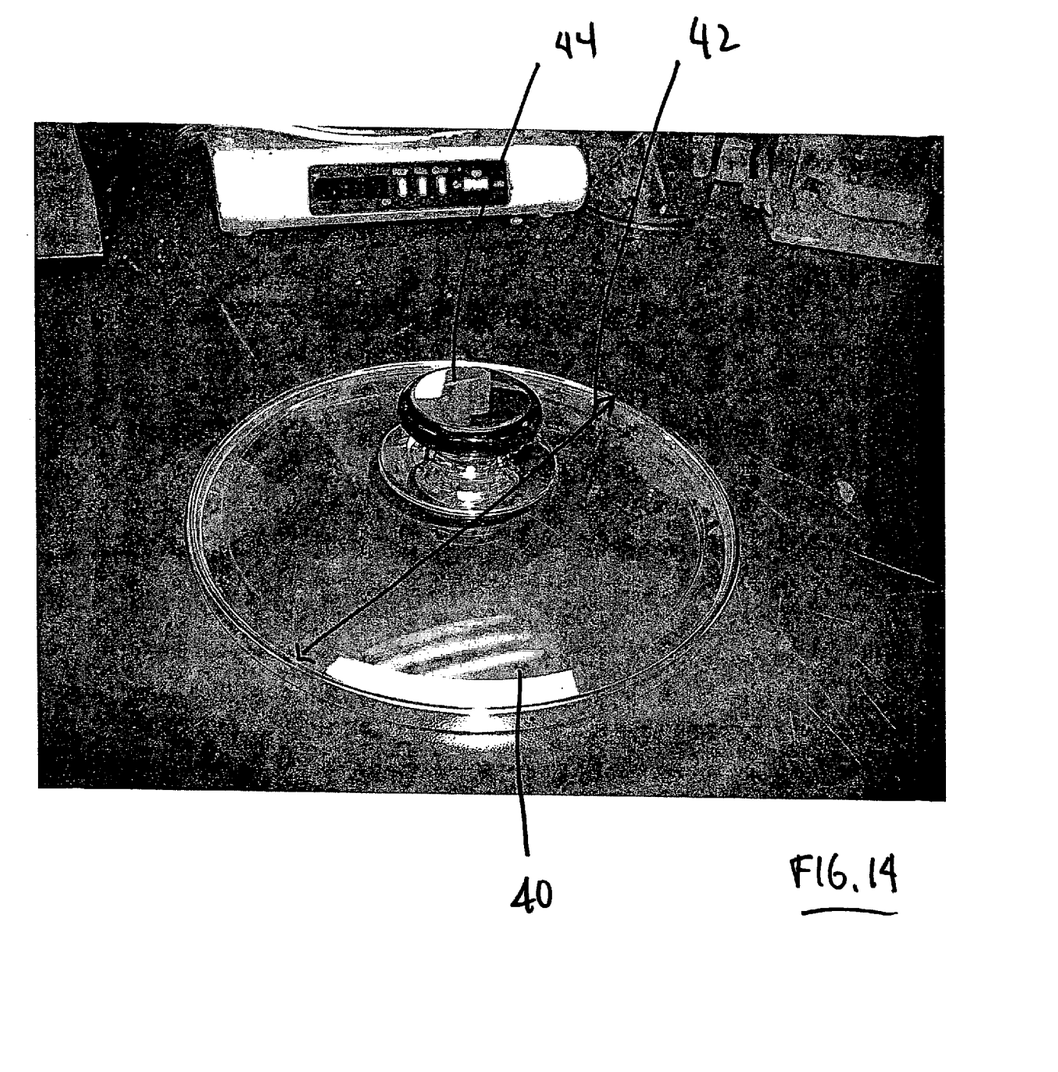
FIG. 14 is a view of a lid of the cooking device, in accordance with the present invention.

Referring to FIG. 14, cooking device 10 has a lid 40. Lid 40 has a fourth diameter 42 that is sufficiently large to cover both recess 20 and bowl 34. The lid 40 is preferably made from a thermally nonconductive material, such a thermoplastic, or any thermally non-conductive polymer. Lid 40 is preferably translucent to allow a user to see the contents cooked by cooking device 10. The lid 40 preferably has a handle 44. Handle 44 is preferably on a top portion of lid 40 to allow the lid to be selectively manipulated by the user. Lid 40, preferably, substantially seals recess 20 and bowl 34 when used to cover the recess and bowl, respectively.

Figure 15:
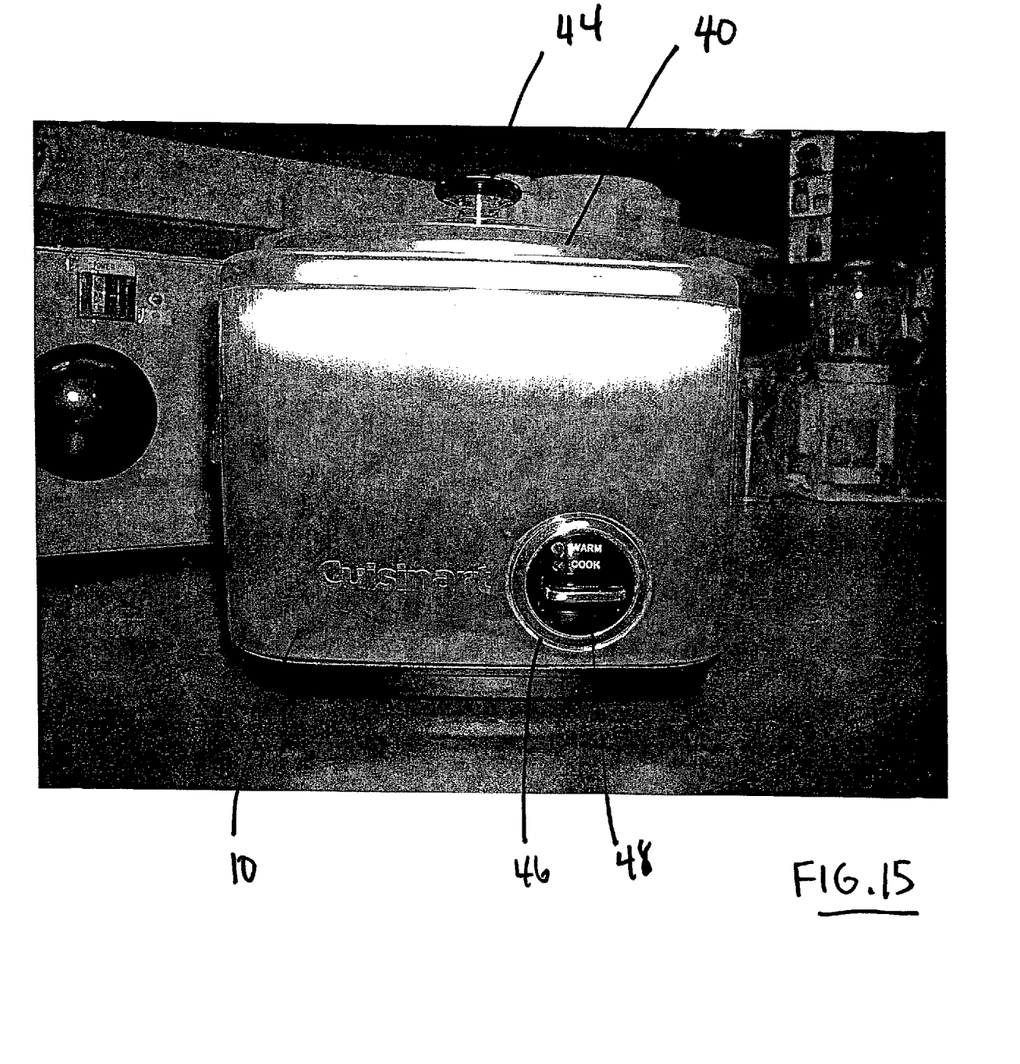
FIG. 15 is a front view of the cooking device, including a control panel, in accordance with the present invention.
Figure 16:
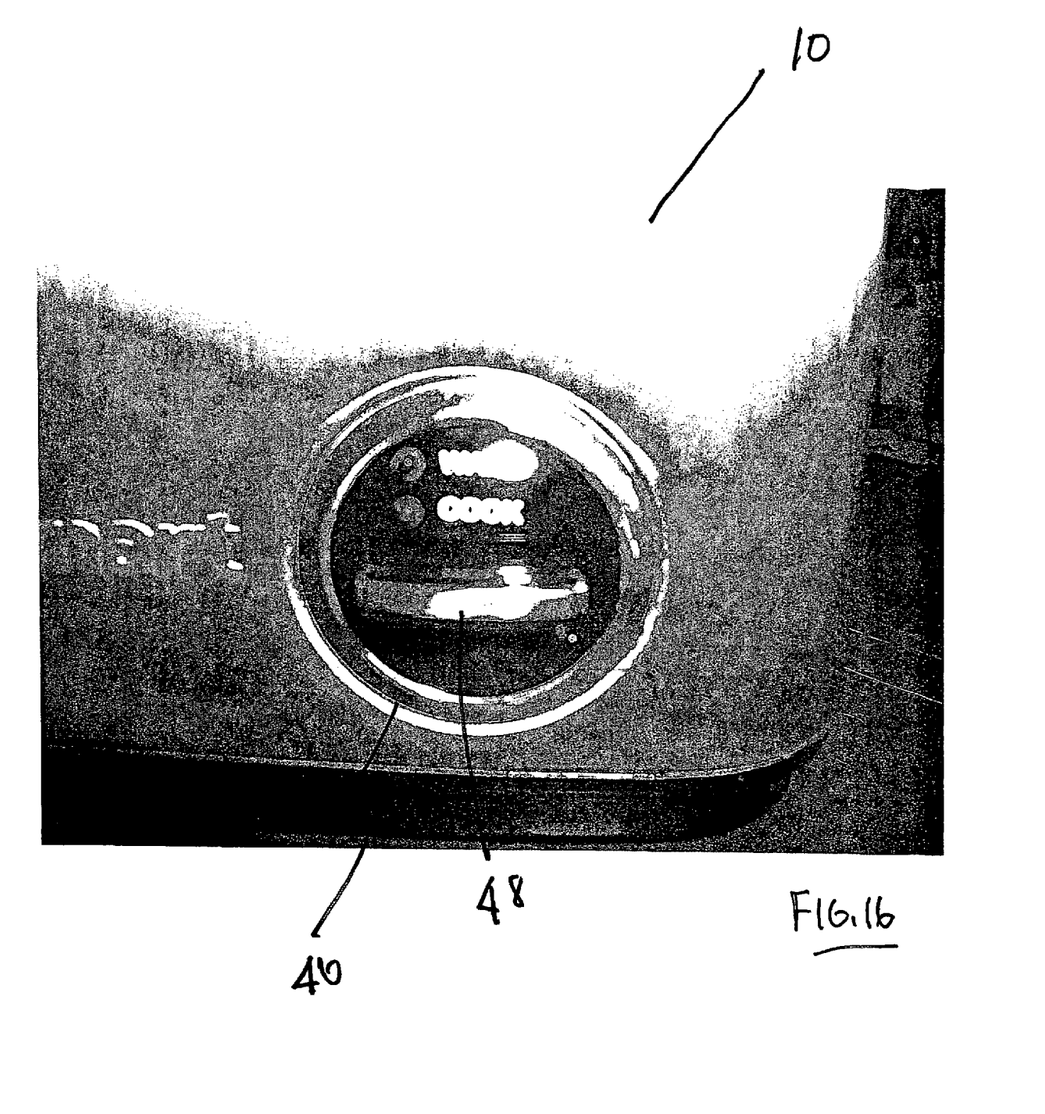
FIG. 16 is a detailed view of the control panel of FIG. 15.

Referring to FIGS. 15 through 16, a front exterior of cooking device 10 having a control panel 46 is shown. Exemplary control panel 46 has a dial 48. Dial 48 is operatively connected to a control module (not shown) that controls the heater. In one aspect, dial 48 controls an amount of power delivered to the heater in response to a rotation of the dial. In this manner, the user may control the heater output by turning dial 48.

It should be appreciated that control panel 46 may be implemented as a digital control panel (not shown) having one or more buttons for controlling the operation of cooking device 10.

It should be understood that the foregoing description is only illustrative of the present invention. Various alternatives and modifications can be devised by those skilled in the art without departing from the invention. Accordingly, the present invention is intended to embrace all such alternatives, modifications and variances.

What is claimed is:

1. A cooking device comprising:
    a housing having a recess therein;
    a bowl having a bottom surface with a plurality of bowl apertures and sidewalls spaced
    for being received in said recess; and
    an intermediate member for positioning said bowl over said recess, wherein said sidewalls of said bowl extend down from said intermediate member and are received in said recess in a first position, and said intermediate member is supported on an upper surface of said recess and said sidewalls extend upwardly from said intermediate member above said recess in a second position, and wherein said intermediate member is integral with and extending radially outward from said bottom surface of said bowl.

2. The cooking device of claim 1, wherein said intermediate member has a plurality of member apertures therethrough.

3. The cooking device of claim 2, wherein said plurality of member apertures align with said bowl apertures.

4. The cooking device of claim 1, wherein said recess has an upper surface with an annular lip located on at least a portion of said upper surface for supporting said intermediate member.

5. The cooking device of claim 1, wherein said housing has a substantially rectangular shaped exterior.

6. The cooking device of claim 1, wherein said housing has two handles, that are located on opposing sides of said cooking device.

7. The cooking device of claim 1, further comprising a heater for heating an item placed in said recess.

8. The cooking device of claim 1, further comprising a lid sized to substantially seal said recess and said bowl.

9. A cooking device comprising:
    a housing having a recess therein;
    a bowl having a bottom surface with a plurality of bowl apertures and sidewalls spaced for being received in said recess; and
    an intermediate member for positioning said bowl over said recess, wherein said sidewalls of said bowl extend down from said intermediate member and are received in said recess in a first position, and said intermediate member is supported on an upper surface of said recess and said sidewalls extend upwardly from said intermediate member above said recess in a second position, wherein said intermediate member connects to said bottom surface of said bowl.

10. A method of cooking a food item, said method comprising:
    placing an amount of liquid in a recess of a cooking device;
    heating said recess to heat the temperature of said liquid to a cooking temperature;
    receiving in said recess, in a first position, sidewalls of a bowl having a bottom surface with a plurality of apertures therethrough; and
    supporting, in a second position, on an intermediate member, said bowl over said recess, wherein said sidewalls of said bowl extend down from said intermediate member and are received in said recess in a first position, and said intermediate member is supported on an upper surface of said recess and said sidewalls extend upwardly from said intermediate member above said recess in a second position, further comprising, in said second position, placing said food item in said bowl for cooking by steam from said heated liquid in said recess.

11. The method of claim 10, further comprising, in said first position, placing for cooking the food item in said heated liquid in said recess for cooking thereby.

12. The method of claim 10, wherein said intermediate member has a plurality of apertures therethrough.

13. The method of claim 12, further comprising substantially aligning said plurality of apertures in said bottom surface of said bowl with said plurality of apertures in said intermediate member.

14. The method of claim 10, wherein said supporting comprises supporting said intermediate member on an annular lip located on at least a portion of an upper surface of said recess.

15. The method of claim 10, wherein said cooking temperature is at least a boiling temperature of said liquid.

16. The method of claim 10, further comprising substantially sealing said recess in said first position and an upper surface of said bowl in said second position.

17. The method of claim 10, further comprising connecting said intermediate member to said bottom surface of said bowl.

* * * * *